United States Patent [19]

Hol et al.

[11] Patent Number: 5,260,369

[45] Date of Patent: Nov. 9, 1993

[54] SYNTHETIC RESIN MASS HAVING A LOW CONTENT OF SHORT CARBON FIBRES

[75] Inventors: Hubertus Hol, Tiel; Theodorus J. M. Timmerman, Lr Haarlem; Kornelis H. J. Wolhoff, Cs Schoorl, all of Netherlands

[73] Assignee: General Electric Company, Pittsfield, Mass.

[21] Appl. No.: 857,053

[22] Filed: Mar. 25, 1992

[51] Int. Cl.$^5$ ................................. C08K 7/06
[52] U.S. Cl. ..................... 524/495; 524/496
[58] Field of Search ............... 523/136, 137; 524/495, 524/496; 252/447.2

[56] References Cited

U.S. PATENT DOCUMENTS

| | | | |
|---|---|---|---|
| 3,876,444 | 4/1975 | McKee | 423/448 |
| 4,137,949 | 2/1979 | Linko et al. | 156/165 |
| 4,320,079 | 3/1982 | Minnear et al. | 264/102 |
| 4,339,322 | 7/1982 | Balko et al. | 429/38 |
| 4,404,125 | 9/1983 | Abolins | 524/496 |
| 4,442,165 | 4/1984 | Gebhardt et al. | 428/307.7 |
| 4,489,181 | 12/1984 | Fox | 523/219 |
| 4,532,054 | 7/1985 | Johnson | 252/12 |
| 4,596,670 | 6/1986 | Liu | 252/511 |
| 4,668,723 | 5/1987 | Bussink et al. | 525/905 |
| 4,826,720 | 5/1989 | Wade | 428/209 |
| 4,966,943 | 10/1990 | Bussink et al. | 525/68 |
| 5,019,616 | 5/1991 | Arakian et al. | 524/494 |

FOREIGN PATENT DOCUMENTS

| | | |
|---|---|---|
| 0032379 | 8/1981 | European Pat. Off. |
| 117327 | 9/1984 | European Pat. Off. |
| 120130 | 10/1984 | European Pat. Off. |
| 339910 | 11/1989 | European Pat. Off. |
| 368312 | 5/1990 | European Pat. Off. |
| 1437314 | 1/1974 | United Kingdom |
| 1486033 | 2/1976 | United Kingdom |
| 1570240 | 11/1977 | United Kingdom |

OTHER PUBLICATIONS

William C. Wake *Fillers for Plastics* 129–136 (1971).

*Primary Examiner*—Veronica P. Hoke

[57] ABSTRACT

The invention relates to a thermoplastic synthetic resin mass in which the synthetic resin mass comprises 0.3–1.0% by weight of carbon fibres having a length from 1–6 millimeters and a maximum of 5% by weight of dyes and pigments plus stabilizers, release agents, reinforcing fibers, flame retardant agents and fillers. The synthetic resin mass preferably comprises a polyphenylene ether, a polystyrene, a polypropylene, an acrylonitrile-butadiene-styrene terpolymer, an aromatic polycarbonate, a polyalkylene terephthalate, a polyamide, a polyphenylene sulphide, a polyetherimide or a mixture of two or more of these polymers. Articles having a beautiful flocculent structure can be obtained from the synthetic resin mass according to the invention.

9 Claims, No Drawings

SYNTHETIC RESIN MASS HAVING A LOW CONTENT OF SHORT CARBON FIBRES

The invention relates to a thermoplastic synthetic resin mass with pastel colour, comprising carbon fibres. Articles molded out of the resin have a certain surface resembling some types of natural stone. More in particular, articles injection-moulded from the synthetic resin mass according to the invention show a very fine flocculent structure.

Synthetic resin masses having a particular surface structure are commercially available. Investigations have demonstrated that the known masses comprise blackened aluminium flocks.

However, the known synthetic resin masses are difficult to process; a kind of black stripe formation occurs during injection-molding. Moreover, the injection-moulding conditions must be adapted over and over again as a result of instability of the melt of the known synthetic resin mass.

After long-lasting investigations it was found that the desired result, namely a well-processable thermoplastic synthetic resin mass having a flocculent surface structure of the articles formed therefrom, could be obtained by using short carbon fibres, in a very low concentration.

The synthetic resin mass according to the invention is characterised in that it comprises 0.3–1.0% by weight of carbon fibres having a length from 1 to 6 millimeters and a maximum of 5% by weight of dyes and pigments plus stabilisers, release agents, reinforcing fibres, flame retardant agents and fillers.

The content of carbon fibres is preferably 0.3–0.7, even more preferably 0.4–0.6% by weight. The length of the fibres is preferably 3–6 mm.

The synthetic resin mass comprises thermoplastic synthetic resins.

The synthetic resin mass preferably comprises a polyphenylene ether, a polystyrene, a polypropylene, an acrylonitrile-butadiene-styrene terpolymer, an aromatic polycarbonate, a polyalkylene terephthalate, a polyamide, a polyphenylene sulphide, a polyetherimide or a mixture of two or more of these polymers.

Even more preferably the synthetic resin mass comprises an acrylonitrile-butadiene-styrene terpolymer or a polyalkylene terephtalate, for example, polybutylene terephthalate.

In addition to the carbon fibres and the synthetic resin, the synthetic resin mass may comprise up to a maximum of five procent by weight of further conventionally used additives, for example, dyes and or pigments, stabilisers, mould-release agents, reinforcing fibres and flame-retardants. To have a pastel colour most but not all synthetic resin compositions should comprise some dyes and/or pigments. If the content of additives is above five % by weight the effect on the surface appearance of the carbon fibres is masked i.e. not visible by the additives.

The use of carbon fibres in synthetic resin masses is known per se. GB-A-1 486 033 describes a liquid coating composition comprising carbon fibres and a heavy loading of fillers. Due to the heavy loading of fillers the special appearance obtained with the mass according to the invention can not be obtained.

GB-A-1 570 240 describes a thermosetting resin composition comprising carbon fibres and textile fibres. Due to the presence of textile fibres the special appearance obtained with the mass according to the invention can not be obtained.

GB-A-1 437 314 describes a thermosetting resin composition with a high content of glass fibres. Objects formed out of this composition will not show the desired surface appearance due to the high glass fibre content.

EP-A-0 032 379 describes the preparation of films out of a polycarbonate solution which comprises carbon fibres. Polycarbonate is a colourless transparent polymer. The addition of carbon fibres to such polymers, without also adding some dyes and or pigments, does not result in the desired surface appearance.

The synthetic resin mass according to the invention is prepared by first compounding the synthetic resin and all other constituents followed by blending the carbon fibres in the melt. This can be effected e.g. by compounding the synthetic resin and the stabilisers thoroughly in a Banburry mixer or an extruder and by adding the carbon fibres shortly before the mass is taken out of the Banburry mixer or before it leaves the extruder.

The fineness of the flocculent structure may be controlled by choosing the quantity of the carbon fibres and by choosing the exact instant at which the carbon fibres are added during the preparation of the synthetic resin mass. Dependent on the compounding process chosen, the addition shortly after the melt temperature has been reached during the compounding process results in a finer flocculent structure in the final product which is obtained from the synthetic resin mass, for example, by injection-moulding.

Good results have been obtained by mixing powdered constituents based on an acrylonitrile-butadiene-styrene terpolymer and a pigment in a Banburry mixer for such a period of time until a temperature of approximately 190° C. is reached. 0.5% By weight of carbon fibres having a length of 2 mm or 4.5 mm or 6 mm were then added and the mixture was thoroughly mixed. Articles having a beautiful flocculent structure could be obtained from the synthetic resin mass thus obtained by injection-moulding.

It has been found that the mechanical properties of the synthetic resin mass and the processing possibilities of the synthetic resin mass (for example, by injection-moulding) were hardly influenced by the presence of the carbon fibres.

We claim:

1. A thermoplastic synthetic resin mass having pastel colour, comprising 0.3–1.0% by weight of carbon fibres having a length of from 1–6 millimeters and a maximum of 5% by weight of one or more additives selected from dyes, pigments, stabilisers, release agents, reinforcing fibres, flame retardant agents or fillers.

2. A synthetic resin mass as claimed in claim 1, wherein the synthetic resin mass comprises 0.4–0.6% by weight of carbon fibres.

3. A synthetic resin mass as claimed in claim 1, wherein the synthetic resin mass comprises carbon fibres having a length of from 3–6 millimeters.

4. A synthetic resin mass as claimed in claim 1, wherein the synthetic resin mass comprises a polyphenylene ether, a polystyrene, a polypropylene, an acrylonitrile-butadiene-styrene terpolymer, an aromatic polycarbonate, a polyalkylene terephthalate, a polyamide, a polyphenylene sulphide, a polyetherimide or a mixture of two or more of the said polymers.

5. A process for the manufacture of a thermoplastic synthetic resin mass having pastel colour comprising compounding the thermoplastic synthetic resin at a temperature of about the melting point of the thermoplastic resin mass together with a maximum of 5% by weight of one or more additives selected from dyes, pigments, stabilisers, release agents, reinforcing fibres, flame retardant agents or fillers, followed by admixing the compounded thermoplastic synthetic resin mass and additive composition with 0.3 % to less than 1.0% by weight of carbon fibres having a length of from 1–6 millimeters.

6. An article prepared by the process of claim 5.

7. An injection-moulded article having a surface which exhibits a very fine flocculent structure resembling natural stone, said article having been produced by a process comprising injection-moulding a synthetic resin mass comprising an acrylonitrile-butadiene-styrene terpolymer, a pigment present at a level effective to give said article a pastel colour, and from 0.3% to 1.0% by weight of carbon fibres based on the total weight of said resin mass, said carbon fibres having a length of from 1 to 6 mm.

8. An article as claimed in claim 7 wherein said synthetic resin mass consists essentially of said acrylonitrile-butadiene-styrene terpolymer, said carbon fibres and said pigment.

9. The article of claim 6 wherein said additive is a pigment.

* * * * *